June 9, 1964 J. MARLOW 3,136,941

TWO TERMINAL MAGNETIC AMPLIFIER APPARATUS

Filed Jan. 27, 1961

United States Patent Office 3,136,941
Patented June 9, 1964

3,136,941
TWO TERMINAL MAGNETIC AMPLIFIER APPARATUS

Jacob Marlow, King of Prussia, Pa., assignor to Robertshaw Controls Company, Richmond, Va., a corporation of Delaware Filed Jan. 27, 1961, Ser. No. 85,254
16 Claims. (Cl. 323—89)

This invention relates to magnetic amplifiers and, in particular, to full wave self-saturating magnetic amplifiers using a single current rectifying device.

In prior magnetic amplifiers of this type, the control of the load current has required the use of a variable three-terminal impedance element which dissipates a relatively high power. The limited variety of condition sensing three-terminal impedance elements and the high power capacity requirement of these elements unduly restricts the application of this type of magnetic amplifier.

An object of this invention, therefore, is to provide a full wave self-saturating magnetic amplifier using a single current rectifying device which is controlled by a variable two-terminal impedance.

Another object is to control the power output of a magnetic amplifier of this type by direct connection of a two-terminal impedance device having a low power rating.

A further object is to control the physical condition with the output of a magnetic amplifier of this type using a two-terminal impedance device which varies inversely in response to the physical condition to provide a simple negative feedback stabilized system for maintaining the physical condition at a constant level independent of supply voltage variation and other factors influencing the level of the condition.

An additional object of this invention is to control a physical condition from the output of a magnetic amplifier of this type by using a reactive circuit providing a two-terminal variable impedance which varies inversely in response to the physical condition to maintain the condition at a level determined by the setting of at least one element of the reactive circuit.

Still another object is to provide a full-wave self-saturating magnetic amplifier using a single current rectifying device which is controlled by a variable impedance device which is isolated from the power supplied to the magnetic amplifier.

These and other objects and advantages of the invention will become apparent from the following description taken in connection with the accompanying drawings wherein.

Figure 1:
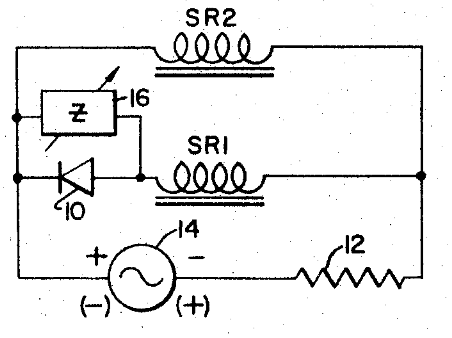
FIG. 1 is a schematic circuit illustrating the control of a full-wave self-saturating magnetic amplifier in accordance with this invention.

Referring now to FIG. 1, there is shown a full-wave self-saturating magnetic amplifier including a saturable reactor SR1 connected in series with a current rectifying element 10 with a second saturable reactor SR2 connected in parallel with the current rectifying element 10 and saturable reactor SR1. The parallel circuit and load 12 are connected to a source of alternating voltage 14. A two-terminal impedance device 16 is connected in parallel with current rectifying element 10. The device 16 can be adjustable to present a given impedance, can vary with respect to a physical condition such as temperature, light, pressure, etc., or can be adjustable and variable.

In prior full-wave self-saturating magnetic amplifiers using a single current rectifying element, the control impedance used to establish the output current at a desired level has been a three-terminal impedance. One terminal has been adjustable with respect to the other two terminals and connected to the point intermediate series connected saturable reactor SR2 and current rectifying element 10. The remaining two terminals have been connected to the terminals of the alternating voltage source 14. While this prior circuit provides satisfactory control of the load current, such control impedance dissipates a relatively large amount of power and requires a three-terminal connection. This rules out the possibility of utilizing a number of variable impedances, such as thermistors, photoconductive cells, infrared radiation detectors, etc., which are two-terminal, low power capacity impedance elements.

In the present invention, the circuit shown in FIG. 1 permits two-terminal impedance devices to be used to control the power output of the magnetic amplifier since impedance device 16 as connected draws very little power.

The operation of the circuit shown in FIG. 1 is as follows: The polarity of the negative half-cycles of the alternating voltage is indicated at the terminals of power source 14 by the plus and minus symbols. The polarity for the positive half-cycles is indicated by the plus and minus symbols shown in parentheses at the treminals of power source 14.

Assume impedance 16 is at its maximum value. During the positive half-cycle of the voltage provided by power supply 14, the current path including the saturable reactor SR1 presents the least impedance to the flow of current since its flux is maintained at substantially the saturation value caused by the preceding positive half-cycle. The impedance presented by this circuit branch is then equal to the resistance inherent in the winding for the saturable reactor SR1.

Saturable reactor SR2, on the other hand, presents a high impedance when a positive half-cycle of the voltage provided by power source 14 is applied to the circuit. This is due to saturable reactor SR2 having been saturated by a current flowing through its winding during the preceding negative half-cycle of the alternating voltage from power source 14. The positive half-cycle tends to change the flux in saturable reactor SR2 set up by the preceding negative half-cycle inducing a counter E.M.F. and, therefore, presents a high impedance to current flow during the positive half-cycle of the power supply voltage.

During the negative half-cycles of the alternating voltage provided by power source 14, the current path including saturable reactor SR1 presents a high impedance since variable impedance 16 has been assumed to have its maximum value and rectifying element 10, of course, is poled to present a high impedance to the negative half-cycles. The path via the winding of saturable reactor SR2 presents an impedance equal only to the resistance inherent in the winding of saturable reactor SR2. That is, there is substantially no change in flux to oppose the flow of current through saturable reactor SR2 as its saturated condition has not been altered by the previous positive half-cycle of the power supply voltage.

Thus, with variable impedance 16 set at its maximum value, maximum current will flow through load 12 during each half-cycle of the input voltage since the firing angle (phase angle of the applied voltage at the time the core of a saturable reactor reaches saturation) for each saturable reactor is near zero to provide full power, full wave output.

Assume now that variable impedance 16 is set at its minimum value. In this case, rectifying element 10 is effectively shorted so that the circuit including saturable reactor SR1 is equivalent to the circuit including saturable reactor SR2. The current through load 12 is then at a minimum value during each cycle since the flux established in one direction in each of these saturable reactors by one half-cycle of the power supply voltage is established at a saturating value in the other direction by the next half-cycle. The only current flowing during each half-cycle is the small reset current needed to reverse the flux established in each saturable reactor during the previous half-cycle. The firing angle is then near 180° and the power as delivered to load 12 is negligible.

It is apparent that the firing angle for saturable reactor SR1 and saturable reactor SR2 will occur between 0° and 180° as variable impedance 16 is varied between its maximum value and minimum value. The variation of variable impedance 16 is thus effective to alter the average value of the impedance of saturable reactor SR1 and saturable reactor SR2 and provides continuous control of the effective value of the full wave current through load 12.

Figure 2:
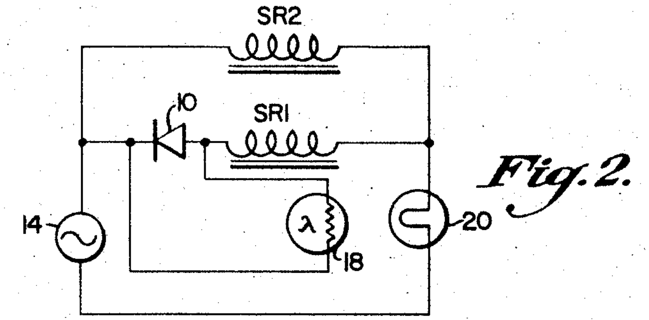
FIG. 2 is a schematic circuit illustrating the use of the circuit of FIG. 1 for providing a constant level of illumination and constant level of power at the light source.
Figures 3, 4:
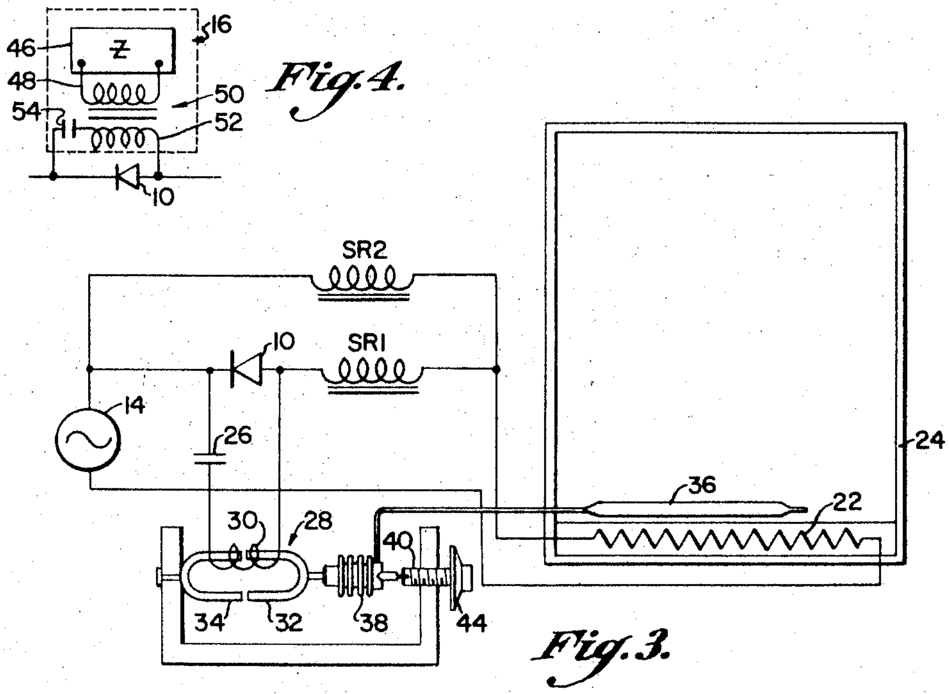
FIG. 3 is a schematic circuit illustrating the use of the circuit of FIG. 1 for selecting a temperature for an enclosure and maintaining the temperature of the enclosure at the selected temperature.
FIG. 4 is a schematic circuit illustrating an impedance device for use with the circuits illustrated in the other figures.

The circuit described in connection with FIG. 1 provides for the stepless control of power supplied to a load. The circuits shown in FIGS. 2 and 3 are embodiments of the invention which are useful for maintaining a particular physical condition constant at a selected level where the level of the physical condition is subject to change due to variations in the voltage supply to the circuits and other external factors. Some of the elements used in the circuits of FIGS. 2 and 3 are identical to those of FIG. 1 and are, therefore, identified by the same reference numerals as in FIG. 1.

The embodiment shown in FIG. 2 is a circuit for maintaining the light energy received by a semiconductor photocell 18 at a constant level or to serve as a constant voltage or current source. The light energy may be received by photocell 18 in part or completely from a light emitting device or lamp 20 the intensity of which varies with current. The light emitting device or lamp 20 is connected as the load for the circuit and may be an incandescent lamp. Photocell 18 is used as the variable impedance element connected in parallel with rectifying element 10 and is movable with respect to lamp 20. Photocell 18 is of the type which presents a lower impedance in response to an increase in light energy impinging on it.

The circuit shown in FIG. 2 can be used to provide a constant voltage or current source. The desired level of current or voltage is initially established by adjusting the amount of light energy that impinges on photocell 18. This may be accomplished in a number of ways, such as varying the distance between the photocell 18 and lamp 20, introducing a shutter between the photocell 18 and lamp 20, using an auxiliary light source having a constant level of illumination to provide a certain portion of the light energy impinging on photocell 18, or by using any of these ways in combination.

Once the desired current or voltage level is selected, it will be maintained at that level even though the voltage supply 14 may vary. This is due to the negative feedback provided by this circuit. Thus, assume the voltage source 14 decreases. This is reflected by a drop in light energy supplied by lamp 20 which is immediately sensed by the photocell 18. A decrease in light energy impinging on photocell 18 causes its impedance to increase. Since the photocell 18 is connected across rectifying element 10, the current through lamp 20 is increased to the level initially selected. An increase in the voltage source 14 causes an increase in the current through lamp 20 to increase the light energy impinging on photocell 18. The impedance of photocell 18 then decreases to cause the current through lamp 20 to decrease to the level initially selected.

It can be seen that the circuit can also be used to maintain the light energy received by the photocell 18 at a constant level. Thus, where the light energy impinging on photocell 18 may be received only in part from lamp 20, the circuit will provide an increase in current through lamp 20 when the light energy level at the photocell 18 decreases below the desired level to increase the light energy supplied by lamp 20 to bring the light energy level at the photocell back to the desired level. When the light energy level at the photocell 18 increases above the desired level, the current through lamp 20 is decreased to reduce the light energy level at photocell 18.

The embodiment shown in FIG. 3 is used to maintain the temperature of an enclosure, such as an oven, constant with provision made to select the level of temperature desired.

As in FIG. 2, changes in current to the load is effective to change the impedance presented in parallel with the rectifying element 10. In this case, a heater element 22 is used as the load of the circuit and is effective to heat an enclosure 24. The variable impedance connected in parallel with rectifying element 10 includes a capacitor 26 connected in series with a variable inductance 28 which varies in response to the temperature of enclosure 24.

The variable inductance includes a winding 30, two U-shaped cores 32, 34, and a hydraulic temperature sensing bulb 36 positioned within enclosure 24 and in fluid connection with a bellows 38. Bellows 38 has one end connected to U-shaped core 32 with the other end of bellows 38 connected to a threaded shaft 40 threaded in one leg of a U-shaped base 42. Threaded shaft 40 extends through the leg of base 42 and has a control knob 44 secured to it. The other U-shaped core 34 is fastened in any suitable manner to the other leg of U-shaped base 42. As the relative position of the U-shaped cores 32, 34 is altered, the inductive impedance presented varies. The relative position of the U-shaped cores 32, 34 varies with the temperature sensed by hydraulic sensing bulb 36 and the position of shaft 40 in the leg of base 42.

For the range of temperature control desired for enclosure 24, the value of capacitor 26 is selected so that the impedance presented by inductance 28 at one point of separation of cores 32, 34 causes the circuit to be in series resonance to offer the minimum impedance shunting rectifying element 10. The point of series resonance may be made to correspond to the minimum gap between core 32 and core 34. This condition causes a minimum output current to pass through heating element 22 and, therefore, corresponds to the minimum temperature developed. The air gap between the two U-shaped cores 32, 34 is increased by turning control knob 44 to cause a decrease in inductance 28 and an increase in the impedance connected across rectifying element 10. An increase in the impedance presented across rectifying element 10 results in an increase in the effective current through heating element 22. The temperature will rise as a result of the increase in current to heating element 22. The fluid in the hydraulic temperature sensing bulb 36 expands with an increase in temperature causing bellows 38 to expand to move core 32 toward core 34. This decreases the gap between the two U-shaped cores 32, 34 to decrease the impedance presented across the rectifying element and thus lower the current through heating element 22 until the current through heating element 22 provides just enough heat to offset the heat loss to maintain the temperature of the enclosure constant. Thus, as in FIG. 2, this circuit also uses negative feedback to maintain the condition being controlled at the selected level. If a different temperature level is desired, control knob 44 can be operated to alter the air gap between U-shaped cores 32, 34.

The impedance device 16 as referred to in FIG. 1 is understood to include any device presenting an adjustable and/or variable impedance at two terminals which may be connected across rectifying element 10. Thus, as shown in FIG. 4, it may include an impedance element 46 connected across the primary winding 48 of a transformer 50 with the secondary winding 52 of the transformer connected in parallel with the rectifying element 10. A suitable capacitor 54 may be connected in series with the latter winding to block the D.C. component through the winding. A device using a transformer isolates the impedance element from the voltage source which may be desirable. It may also provide impedance matching to enable the range of change available from a particular variable impedance element to present the proper impedance change for controlling the amplifier.

Many modifications may be made in this invention without departing from the scope of the invention as exemplified in the above described embodiments and defined in the appended claims.

I claim:

1. A magnetic amplifier for controlling the current to a load from an alternating voltage source, comprising a first saturable reactor connected in series with the alternating current source and the load, a circuit including a second saturable reactor and a series connected rectifying element both being in parallel with said first saturable reactor, and a two-terminal condition-sensing variable impedance element connected in parallel with said rectifying element and in series with said second saturable reactor.

2. A magnetic amplifier for controlling the current to a load from an alternating voltage source, comprising a first saturable reactor adapted for connection in series with the alternating current source and the load, a circuit including a second saturable reactor and a series connected rectifying element connected in parallel with said first saturable reactor, condition-sensing means including an impedance element and a transformer having a primary winding and a secondary winding, said condition-sensing means being connected in parallel with said primary winding, and circuit means including said second winding connected in parallel with said rectifying element.

3. A circuit for controlling alternating current power from a supply in variable amount to maintain an energy condition constant in a controlled space in response to energy sensing means disposed therein, comprising load means connected to said supply for increasing said energy condition when energized, a series circuit including a first saturable reactor and said load for connection across the alternating voltage source, a circuit including a second saturable reactor and a series connected rectifying element connected in parallel with said first saturable reactor, and a circuit connected in parallel with said rectifying element having an impedance which varies inversely in response to changes in said energy condition.

4. A circuit for controlling alternating current power from a supply in variable amount to maintain an energy condition constant in a controlled space in response to energy sensing means disposed therein, comprising load means connected to said supply for increasing said energy condition when energized, a series circuit including a first saturable reactor and said load for connection across the alternating voltage source, a circuit including a second saturable reactor and a series connected rectifying element connected in parallel with said first saturable reactor, an impedance device presenting an impedance which varies in response to the energy condition connected in parallel with said rectifying element and adjustable to present a predetermined impedance when subject to said energy condition of a predetermined level.

5. A circuit for controlling alternating current power from a supply in variable amount to maintain an energy condition constant in a controlled space in response to energy sensing means disposed therein, comprising load means connected to said supply for increasing said energy condition when energized, a series circuit including a first saturable reactor and said load for connection across the alternating voltage source, a circuit including a second saturable reactor and a series connected rectifying element connected in parallel with said first saturable reactor, a series connected capacitor and inductor connected in parallel with said rectifying element, and means operatively connected to said inductor and adapted to be responsive to the energy condition to vary the impedance presented by said inductor.

6. A circuit for controlling alternating current power from a supply in variable amount to maintain an energy condition constant in a controlled space in response to energy sensing means disposed therein, comprising load means connected to said supply for increasing said energy condition when energized, a series circuit including a first saturable reactor and said load for connection across the alternating voltage source, a circuit including a second saturable reactor and a series connected rectifying element connected in parallel with said first saturable reactor, a device presenting an inductive impedance which varies in response to the energy condition and adjustable to present a predetermined inductive impedance when subject to the energy condition at a predetermined level, a capacitor connected in series with said inductive impedance, and means connecting said capacitor and said series connected inductive impedance in parallel with said rectifying element.

7. A circuit for connection to an alternating voltage source for maintaining the temperature of an enclosure at a predetermined level, comprising a heating element, a series circuit including a first saturable reactor, said element and a rectifying element, adapted for connection across the alternating voltage source, a circuit including a capacitor and a series connected inductor connected in parallel with said rectifying element, and means operatively connected to said inductor and adapted to be responsive to the temperature of the enclosure to cause the impedance presented by said inductor to vary inversely with the temperature of the enclosure.

8. A circuit for connection to an alternating voltage source for maintaining the temperature of an enclosure at a predetermined temperature, comprising a heating element, a series circuit including a first saturable reactor, said element and a rectifying element adapted for connection across the alternating voltage source, a circuit including a capacitor and an inductor including a winding connected in series with said capacitor and a positionable core movable with respect to said winding, a bellows having one end connected to said positionable core, a support member, a threaded shaft extending through said support member and connected to the other end of said bellows, and a hydraulic temperature sensing bulb adapted to be disposed in the enclosure and means connecting said bulb to said bellows to position said core in response to changing temperature of the enclosure to vary the impedance of said inductor.

9. A magnetic amplifier for connection to an alternating voltage source, comprising a light producing element, a series circuit including a first saturable reactor and said element adapted for connection across the source of alternating voltage, a circuit including a second saturable reactor and a series connected rectifying element connected in parallel with said first saturable reactor, and a photocell connected in parallel with said rectifying element and positionable to respond to light produced by said light producing element.

10. A magnetic amplifier for connection to an alternating voltage source, comprising a light producing element, a series circuit including a first saturable reactor and said element adapted for connection across the source of alternating voltage, a circuit including a second saturable reactor and a series connected rectifying element connected in parallel with said first saturable reactor, photoconductive means presenting an impedance which varies in response to light energy, said means being responsive to light produced by said light producing element and adjustable to present a predetermined impedance when the light produced by said light producing element is at a predetermined intensity, and means connecting the impedance presented by said photoconductive means in parallel with said rectifying element.

11. A magnetic amplifier for controlling a load from an alternating current source, comprising a first saturable reactor connected in series with said alternating current source and said load, a circuit including a second saturable reactor element and a series connected rectifier element, said elements being connected across said first saturable reactor, and a condition sensing device having an impedance variable with an ambient condition connected across said rectifier element and in series with said second reactor, thereby to present a reverse current path around said rectifier element which varies in accordance with said condition to control the degree of desaturation during nonconducting half cycles.

12. A magnetic amplifier for the control of a load current energized by alternating current, comprising an A.C. source, a load circuit connected at one side thereof to one side of said source, a saturable reactor connected from the other side of said load element to the other side of said A.C. source, a second saturable reactor connected in series with a rectifying element as a parallel shunt to first said saturable reactor, and condition responsive variable impedance means connected in parallel with said rectifying element, thereby to form a part of the shunt circuit for first said saturable reactor, said variable impedance having but two terminals and being of relatively high impedance for low-level control of the current in said load element.

13. A magnetic amplifier for the control of the current in a load by means of two external leads thereto, comprising a source of alternating current power, a load element connected at one side thereof to said source of power, a saturable reactor connected in series with said load element and said source, a second saturable reactor connected in parallel with said first saturable reactor and having in series therewith a rectifying element, a sensing device including a variable impedance element connected in parallel with said rectifying element whereof the impedance varies inversely with an ambient condition, said impedance element thereby controlling the reverse direction current tending to desaturate said second reactor and to control alternating current in said saturable reactors in opposite sense to changes in said condition.

14. In a magnetic amplifier connected in series with a load element and a source of alternating current power the combination of a first saturable reactor in series only with such source of power and said load element, a combined circuit consisting of a rectifier and a second saturable reactor connected in parallel with said first saturable reactor, said combined circuit forming a shunt for said first saturable reactor, condition sensing means operative with only two external terminals connected one at either end of said rectifier and having a value of impedance variable with a sensed condition for controlling the admittance to reset current from said second saturable reactor when the rectifier is not conducting.

15. The method of controlling the magnitude of an alternating current to variably energize a load circuit in accordance with changing energy requirements to maintain a measurable value of an ambient condition, comprising the steps of energizing said load through at least one saturable reactor in a manner to supply excessive energization for said value when said reactor is saturated and insufficient energization when said reactor desaturates during first alternate half cycles of said alternating current, rectifying the current passing through said reactor to cause load energization therethrough only during second alternate half cycles to effect saturation in said reactor after repeated half cycles of current of like polarity, bleeding off a portion of the energy stored during saturation of said reactor through an impedance path variable in impedance between that necessary to fully desaturate and to leave saturated said reactor, measuring departures from said value in terms of a variable impedance which changes with said ambient condition, and utilizing variations of impedance representing changes in said value to control the extent of desaturation in said reactor during said first alternate half cycles for effecting load circuit energization in proportion to said energy requirements.

16. The method of controlling the magnitude of an alternating current to energize a load circuit in accordance with energy requirements to effect a predetermined value of an ambient condition, comprising the steps of energizing said load through a pair of parallel-connected saturable reactors in a manner to supply energy in excess of said requirements when said reactors are saturated and in sufficient energy for said requirements when said reactors desaturate during each half cycle of said alternating current, rectifying the current passing through at least one said reactor to cause load energization therethrough only during first alternate half cycles to effect saturation in said reactors after repeated half cycles of current of like polarity, bleeding off a portion of the energy stored during saturation of said one reactor through an impedance path variable in impedance between that necessary to fully desaturate and to leave saturated said one reactor, measuring departures from said value in terms of a variable impedance which changes with said ambient condition, and utilizing changes of impedance representing changes in said value to control the extent of desaturation in said one reactor during second alternate half cycles for effecting load circuit energization in proportion to said energy requirements.

References Cited in the file of this patent

UNITED STATES PATENTS

| | | |
|---|---|---|
| 2,423,114 | Potter | July 1, 1947 |
| 2,907,947 | Steinitz | Oct. 6, 1959 |